United States Patent [19]

O'Brien

[11] Patent Number: 5,535,419
[45] Date of Patent: Jul. 9, 1996

[54] SYTEM AND METHOD FOR MERGING DISK CHANGE DATA FROM A FLOPPY DISK CONTROLLER WITH DATA RELATING TO AN IDE DRIVE CONTROLLER

[75] Inventor: Rita M. O'Brien, Austin, Tex.

[73] Assignee: Advanced Micro Devices, Sunnyvale, Calif.

[21] Appl. No.: 250,294

[22] Filed: May 27, 1994

[51] Int. Cl.$^6$ .............................. G06F 13/00; G06F 13/14
[52] U.S. Cl. ........................... 395/856; 395/841; 395/846; 395/823; 395/835; 360/61; 369/56
[58] Field of Search ........................... 364/900; 340/365; 395/841, 846, 823, 829, 831, 834, 835, 847, 857, 858, 856; 360/61; 369/56

[56] References Cited

U.S. PATENT DOCUMENTS

| | | | |
|---|---|---|---|
| 3,781,874 | 12/1973 | Jennings | 340/365 |
| 4,663,732 | 5/1987 | Robinson | 364/900 |

FOREIGN PATENT DOCUMENTS

| | | |
|---|---|---|
| 0176976 | 9/1985 | European Pat. Off. . |
| 0473454 | 8/1991 | European Pat. Off. . |
| 2153114 | 8/1985 | United Kingdom . |

OTHER PUBLICATIONS

Mueller, Scott, Upgrading and Repairing PC's, Que, 1993, third edition, pp. 602–709.

Case, Brian, "PCMCIA defines Standard for PC cards; originally intended for memory, standard expands to cover I/O", Microprocessor Report, Dec. 9, 11992, v6. n16, p17(6).

Harper, Jim, "A DOS redirector for SCSI CD–ROM: putting the pieces together", Dr. Dobb's Journal, Mar. 1993, v18 n3 p.44.

Legg, G., "PCI local bus gathers momentum", *EDN Electrical Design News*, (Feb. 3, 1994), vol. 39, No. 3, pp. 25–31.

*Primary Examiner*—Thomas C. Lee
*Assistant Examiner*—Duo Chen
*Attorney, Agent, or Firm*—B. Noel Kivlin

[57] ABSTRACT

A system is disclosed for merging data from two separate registers at different locations in a computer system. A floppy drive controller is provided as part of a companion chip located separately from an IDE drive controller. Both controllers include a data register with the same address to make the system compatible with prior BIOS programs. The register in the floppy controller includes a DSK CHG bit as bit D7 of a direct input register (DIR), which is obtained from the DSK CHG# signal from the floppy drive. In the present invention, the DSK CHG# signal from the floppy drive is connected directly to the bus interface unit (BIU) of the integrated processor. The processor merges this signal with data bits D0–D6 of the IDE controller by determining the location of the IDE controller from the Address Control Register (ACR), which is determined during system initialization. The floppy drive controller also is programmed during system initialization not to respond to an access to address value 3F7h by programming a configuration register in the controller. The BIU determines whether it should merge the data or whether the IDE controller will merge the data by checking the status of a MERGE bit in the ISACFG register, which also is configured during system initialization.

28 Claims, 5 Drawing Sheets

SYSTEM AND METHOD FOR MERGING DISK CHANGE DATA FROM A FLOPPY DISK CONTROLLER WITH DATA RELATING TO AN IDE DRIVE CONTROLLER

BACKGROUND OF THE INVENTION

1. Field of the Invention

The present invention relates generally to a system for merging data from two different locations, both of which have been assigned the same address value.

2. Description of the Relevant Art

More particularly, the invention relates to a system for providing status information to a central processing unit (CPU) regarding removal of a floppy disk from a floppy disk drive and merging that information with data originating from a separate location. Still more particularly, the present invention relates to a system for combining floppy disk change data with data relating to the status of an integrated drive electronics ("IDE") hard drive controller in a system in which the floppy disk controller is located separately from the integrated drive electronics ("IDE") controller.

In prior personal computer systems, shown generally in FIG. 1, a floppy disk drive and integrated drive electronics for a hard drive typically were provided on the same physical card with a single controller that controlled the operation of each of these components. The controller typically connected to a central processing unit ("CPU") through an ISA bus or other bus structure. In these prior art systems, the controller included an 8-bit configuration register that performed various functions. One of the functions of that configuration register was to store and provide information to the CPU indicating whether the disk in the floppy drive had been changed. Such a change was indicated by the status of data bit D7 of that configuration register. Each time that the floppy disk was changed, bit D7 of the configuration register was set. The other data bits, D0–D6 of the controller configuration register were dedicated for IDE operations.

In accordance with the convention of these prior systems, the configuration register was assigned an address value of 3F7h. Consequently, when the CPU sought a read from the configuration register regarding either the status of the floppy disk change bit (bit D7), or of information relating to the IDE drive (bits D0–D6), the CPU would generate an address signal with a value of 3F7h to access this configuration register. In these prior systems, the address of the configuration register typically would be loaded into the CPU by the system BIOS (basic input/output system) during system initialization or "boot-up."

Recently, there has developed a trend in the computer industry to integrate components that were previously provided separately onto one or more integrated circuits. An example of such a computer system is shown, for example in FIG. 2. FIG. 2 is a block diagram of a computer system 10 including a microprocessor (CPU) 12, a CPU local bus 14 coupled to the microprocessor 12, and a local bus peripheral device 18 coupled to the CPU local bus 14. A PCI standard bus 20 is coupled to the CPU local bus 14 through a PCI bus bridge 22, and an ISA (Industry Standard Architecture) bus 24 is coupled to the CPU local bus 14 through ISA bus bridge 26. A PCI peripheral device 28 is shown coupled to the PCI bus 20, and an ISA peripheral device 30 is shown coupled to the ISA bus 24.

Microprocessor 12 is illustrative of, for example, a model 80486 microprocessor, and CPU local bus 14 is exemplary of an 80486-style local bus. The CPU local bus 14 includes a set of data lines D[31:0], a set of address lines A[31:0], and a set of control lines (not shown individually). Additional details regarding the various bus cycles and protocols of the 80486 CPU local bus 14 are described in numerous publications, and as such are not set forth in detail herein.

The PCI bus bridge 22 provides a standard interface between the CPU local bus 14 and the PCI bus 20. As such, PCI bus 20 bridge 22 orchestrates the transfer of data, address, and control signals between the two buses. PCI bus 20 is a high performance peripheral bus that supports burst-mode data transfers and that includes multiplexed data/address lines AD[31:0]. The PCI peripheral device 28 is illustrative of any PCI compatible peripheral device, such as a disk controller.

The ISA bus 24 of FIG. 2 supports the connection of ISA peripheral devices within the computer system 10. The ISA bus 26 coordinates the transfer of data, address, and control signals between the CPU local bus 14 and the ISA bus 24. Although the ISA bus is a relatively low performance bus, the inclusion of the ISA bus within the computer system permits various ISA peripheral devices to be connected within the system. A wide variety of such ISA compatible peripheral devices are available commercially.

The microprocessor 12, PCI bus bridge 22 and ISA bus bridge 26 have traditionally been fabricated on separate integrated circuit chips. A recent trend in computer systems has developed, however, in which the CPU core components are combined with a variety of peripheral devices on a single integrated processor chip. For example, the integrated processor chip may include a bus bridge to provide a high performance interface between an internal CPU local bus and an external bus, such as a PCI bus. By providing a high performance interface to an external PCI bus, relatively high performance characteristics can be achieved with respect to external data transfers.

In light of the recent trend toward greater system integration, it would be desirable to develop a system in which the floppy drive controller and the IDE drive controller are located separately thereby allowing one or both of these components to be incorporated into other integrated circuits. Separating these controllers therefore increases system flexibility. For example, as additional components are fabricated on a single integrated circuit, it would be desirable to include the floppy drive controller on such an integrated circuit that connects to the processor through the PCI bus. Similarly, it would be desirable to separately locate an IDE controller on either the ISA bus or the PCI bus, or in appropriate circumstances, to eliminate the IDE controller from the system.

To be compatible with prior BIOS systems, however, it is necessary that both the floppy drive controller and the IDE controller include a configuration register with an address value of 3F7h. The register in the floppy drive controller with an address value of 3F7h must include a data bit (D7) that provides status information regarding the removal of a disk from the floppy drive. Similarly, the configuration register in the IDE controller with an address value of 3F7h must include seven data bits (D0–D6) regarding the status and operation of the IDE drive.

If the IDE controller is located separately from the floppy controller, a problem therefore arises because these two units include two separate registers which are both addressed by the same value. Consequently, if the CPU is programmed by the system BIOS to make a read request to 3F7h to gather data bits D0–D7, the possibility arises that two different data signals will be driven on the system at the same time—one signal from the floppy controller providing bit D7, and a separate signal from the IDE controller providing bits D0–D6. As one skilled in the art will immediately understand, driving two signals on the system at the same time causes a problem with bus contention. Thus, while it is desirable to separate the operation of the floppy drive controller and the IDE drive controller for system flexibility, it is difficult to do so because of the desire for compatibility with prior BIOS systems.

SUMMARY OF THE INVENTION

The problems outlined above are in large part solved by a computer system that provides a floppy drive controller as part of an integrated companion circuit connected to the PCI bus, and also includes an IDE controller located separately from the floppy drive controller. Both the floppy drive controller and the IDE controller include a configuration register with an address value of 3F7h to provide backwards compatibility with prior BIOS systems. In accordance with the principles of the present invention, the data from the floppy drive controller (D7) is merged with the data from the IDE controller (D0–D6).

The system includes a bus interface unit (BIU) that includes an Address Control Register (ACR) which is programmable to identify the location of the IDE controller, and also, in the preferred embodiment, the location of the floppy drive controller. The BIU also includes a second configuration register (called ISACFG), which includes a MERGE bit to identify which component is to perform the merger of bit D7 (from the floppy drive controller) with bits D0–D6 (from the IDE controller). Preferably, either the BIU or the IDE controller perform the merger according to the status of the MERGE bit.

In the preferred embodiment, a DSK CHG# output signal from the floppy drive connects directly to both the floppy drive controller and to the integrated processor. Because of the direct connection to the integrated processor, it is possible to eliminate an output pin from the integrated circuit on which the floppy drive is located. The floppy drive controller also includes a configuration register (C2), which includes a programmable bit which determines whether the floppy drive controller will respond to accesses to address 3F7h.

By configuring the system in this manner, a great degree of flexibility is achieved while avoiding the possibility of bus contention. For example, the IDE controller can be located on either the ISA bus or the PCI bus, or not provided in the system at all. In addition, either the BIU or the IDE controller may be programmed to perform the merger of bits D0–D6 with bit D7.

BRIEF DESCRIPTION OF THE DRAWINGS

Other objects and advantages of the invention will become apparent upon reading the following detailed description and upon reference to the accompanying drawings in which.

Figure 1:
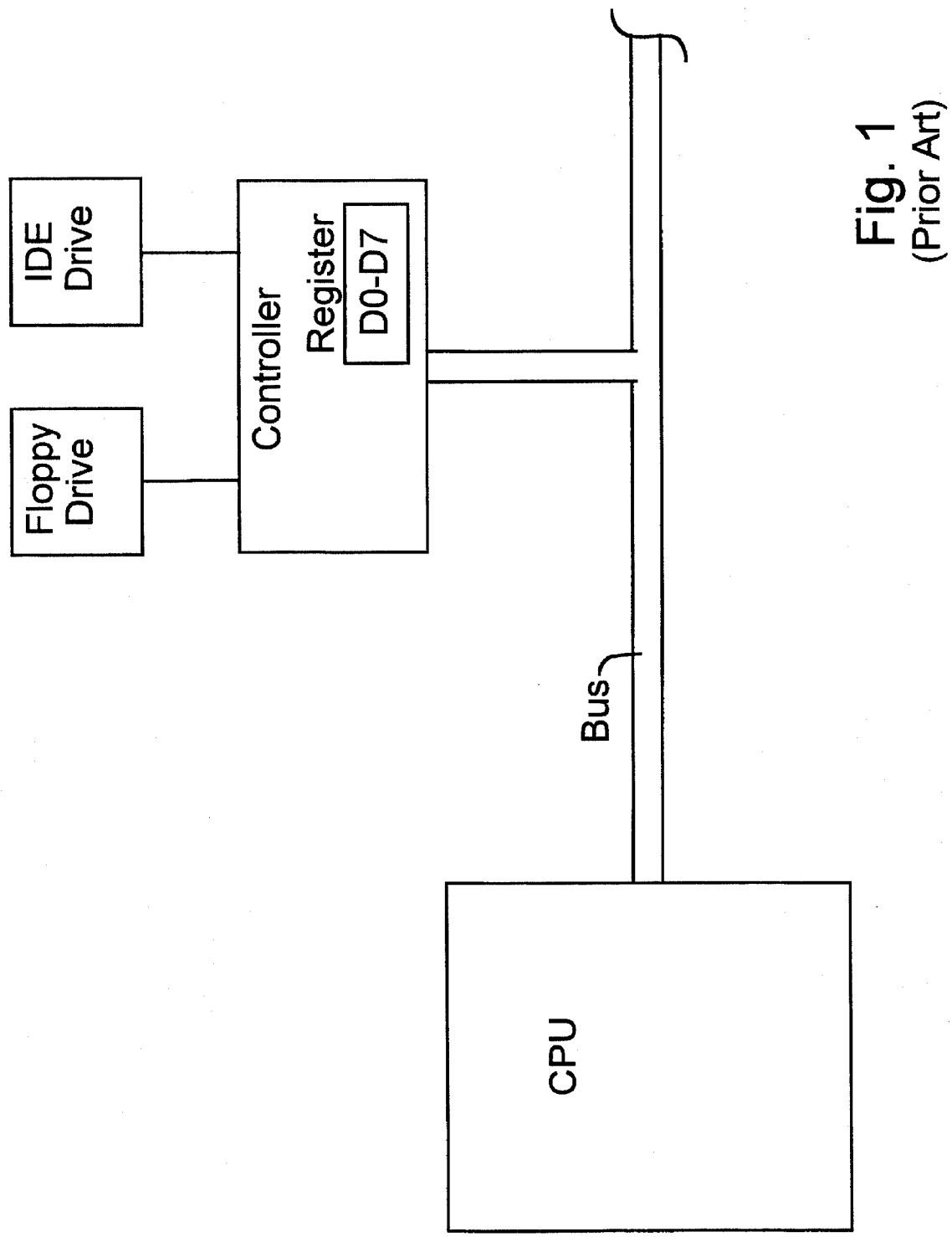
FIG. 1 shows a prior art system with a unitary controller for both a floppy drive and for an IDE drive.
Figure 2:
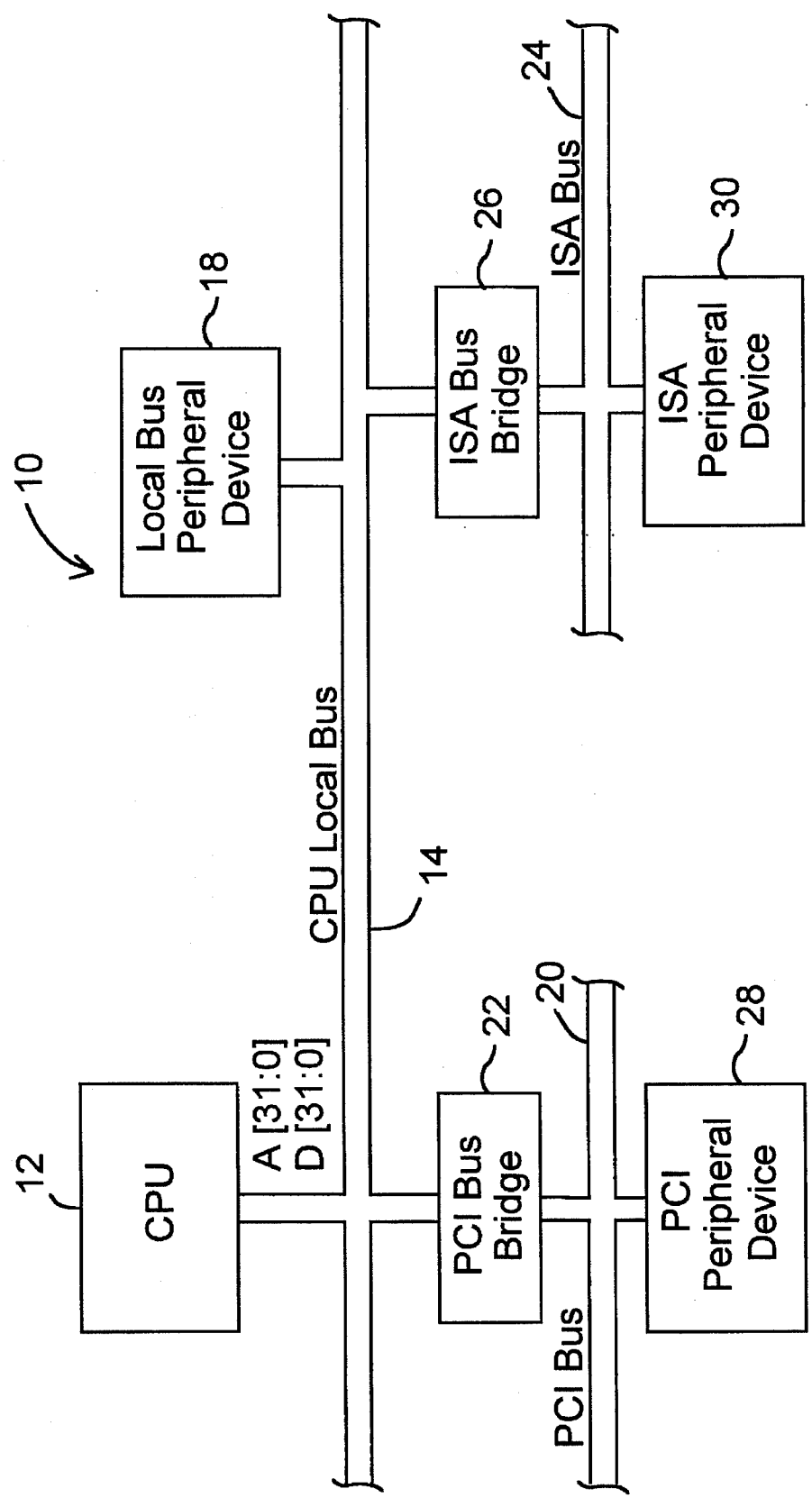
FIG. 2 depicts a functional block diagram of a prior art computer system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Figure 3:
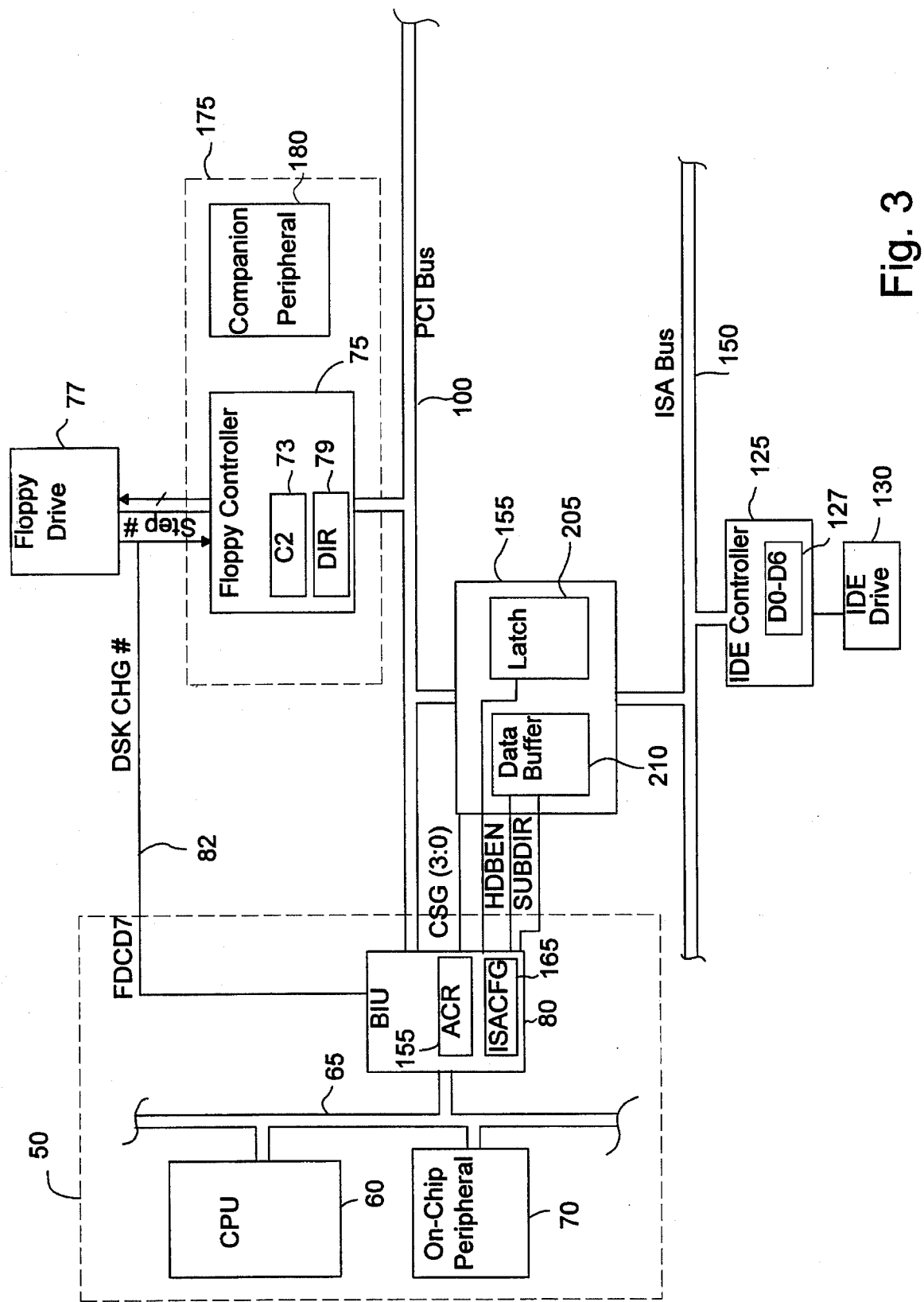
FIG. 3 depicts a functional block diagram of the computer system constructed in accordance with the preferred embodiment wherein the IDE controller is implemented on an ISA bus.
Figure 4:
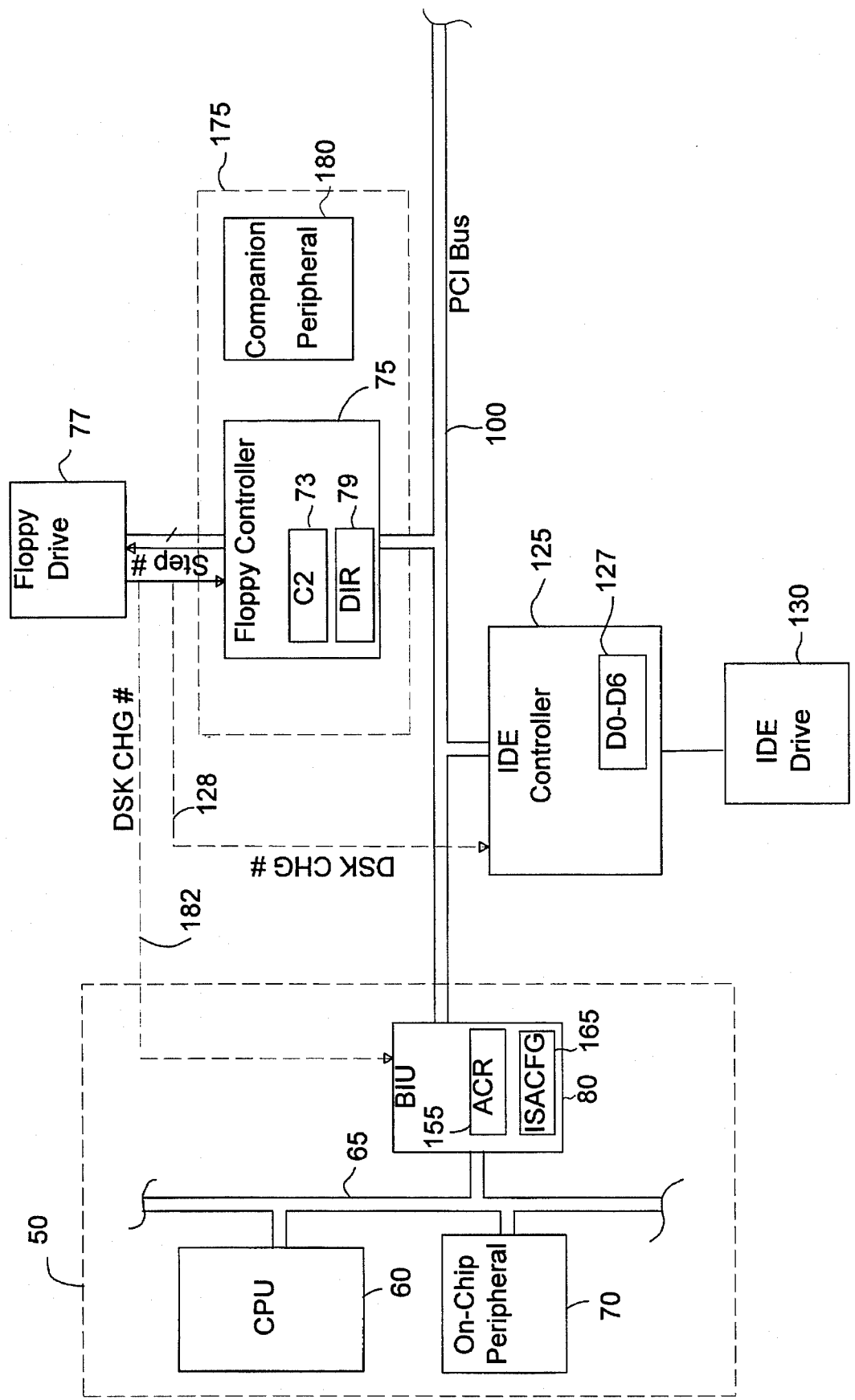
FIG. 4 shows a functional block diagram of an alternative arrangement to FIG. 2 in which the IDE controller is implemented on a PCI bus.

Referring now to FIG. 3, a computer system constructed in accordance with the preferred embodiment generally comprises an integrated processor ("IP") 50, an external floppy drive controller 75 connected to the integrated processor 50 via a PCI bus 100, and an IDE controller 125 residing on an ISA bus 150 and connected to the integrated processor 50 by an ISA bridge 155. Alternatively, as shown in FIG. 4, the IDE controller 125 may be connected to the IP 50 through PCI bus 100. The same reference numbers have been used in FIGS. 3 and 4 to indicate identical elements.

Referring still to FIG. 3, the PCI bus 100 preferably comprises the main inter-device bus for transfer of data in the computer system of the present invention. The PCI bus 100 is a high performance 32-bit multiplexed address/data bus with multi-master capabilities, capable of supporting several PCI masters. The multiplexed address/data lines AD[31:0] and the control lines of the PCI bus 100 preferably connect to a bus interface unit 80 and to PCI peripheral components such as the floppy drive controller 75. The PCI bus 100 also preferably connects to the ISA bus 150 through ISA bridge 155. The control lines preferably include command/byte enables, a cycle frame signal, and various other control signals. The Cycle Frame signal (FRAME#) is a sustained input/output signal, which preferably comprises an active low signal driven by a PCI device to indicate the beginning and duration of a transaction. FRAME# therefore is asserted to signal the beginning of a bus transaction and when FRAME# is de-asserted, the transaction is indicated to be in the final data phase. Additional features regarding the PCI bus are described in the publication "PCI Local Bus Specification," PCI Special Interest Group, Hillsboro, Oreg., the details of which are incorporated by reference herein.

The integrated processor 50 preferably includes a central processing (CPU) core 60, a CPU local bus 65 coupled to the CPU core 60, the bus interface unit (BIU) 80, and an on-chip peripheral device 70. Each of the illustrated components of the integrated processor 50 preferably are fabricated on a single integrated circuit and are housed within a common integrated circuit package. It should be understood, however, that the BIU or other components located on the integrated processor could be located externally from the processor, or alternatively, other components such as the ISA bridge 155 could be included as part of the IP 50 without departing from the principles of the present invention.

In the preferred embodiment, the CPU core 60 implements a model 80486 microprocessor instruction set and CPU local bus 65 comprises a model 80486-style local bus. Thus, in the preferred embodiment, the CPU local bus 65 includes a 32-bit set of data lines D[31:0], a 32-bit set of address lines A[31:0], and a set of control lines (not shown specifically). It should be understood, however, that the CPU core 60 could be configured to implement other microprocessor-type instruction sets without departing from the principles of the present invention.

The on-chip peripherals block 70 preferably represents a variety of peripheral devices that may be implemented in the integrated processor 50. For example, components such as a direct memory access controller (DMA), a memory controller unit (MCU) or an interrupt controller may be included as an integral part of the integrated processor package. As one skilled in the art will understand, various peripherals may be provided as part of the integrated processor 50.

As will be understood by one skilled in the art, the bus interface unit (BIU) 80 provides a standard interface between the CPU local bus 65 and the PCI bus 100. As such, the BIU 80 orchestrates the transfer of data, address, and control signals between the CPU local bus 65 and PCI bus 100 and between the CPU local bus 65 and the ISA bus 150. In the preferred embodiment, the BIU 80 includes several sub components (not specifically shown) including a PCI bus bridge, a local bus controller, and an ISA bus controller.

The BIU 80 preferably includes a first configuration register 155 that includes a dedicated configuration bit, and a second configuration register 165 with a dedicated merge bit. Both of these bits preferably are configured by the system BIOS during system initialization. As one skilled in the art will understand, these two bits could be located in registers performing other functions, or could be located in specifically dedicated registers, or could be located in the same register.

Figure 5A:
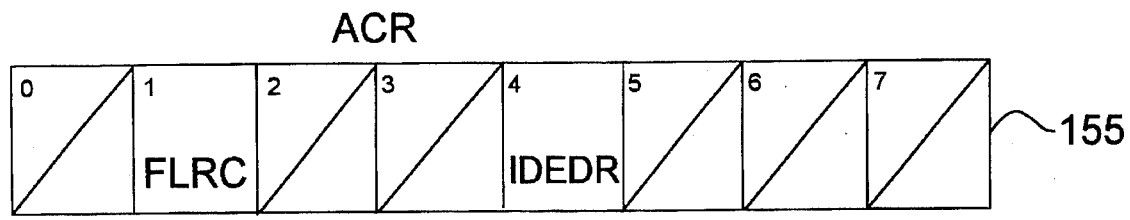
FIGS. 5A–5D illustrate the configuration registers in accordance with the preferred embodiment of the present invention.

In the preferred embodiment, the first configuration register 155 comprises an Address Control Register or ACR. As shown in FIG. 5A, the ACR includes a dedicated bit, called the IDEDR bit (which is bit 4 of the ACR in the preferred embodiment), which indicates the location of the IDE drive controller 125 in the system. If the IDEDR bit is high, the IDE controller is indicated as being on the PCI bus and all accesses to the IDE controller are made by performing a PCI bus cycle in accordance with conventional techniques. If ACR bit 4 is low, the IDE controller is indicated as residing on the ISA bus and all IDE accesses are routed to the ISA bus. In addition to providing the IDEDR bit, bit 1 of the ACR 155 preferably comprises a FLCR bit that indicates the location of the floppy drive controller 75. If bit 1 of the ACR 155 is low, the floppy drive controller is indicated as residing on the PCI bus 100. If the FLCR bit is high, the floppy drive controller 75 is indicated as residing on the ISA bus 150.

Figure 5B:
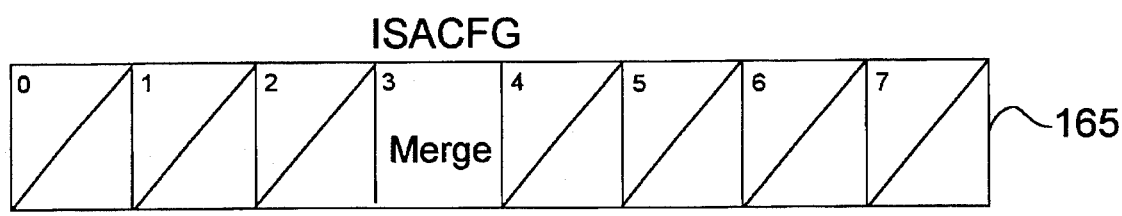

Referring now to FIGS. 3 and 5B, the second configuration register 165 preferably comprises the ISA bus configuration register (ISACFG), with a MERGE bit as bit 3 of that register. The manner in which data from the floppy drive controller and the IDE drive controller are merged is determined by the status of the MERGE bit in the ISACFG register 165. If bit 3 of the ISACFG register 165 is low, the merge is disabled in the BIU 80, so that merger must occur in the IDE controller 125. Conversely, if bit 3 is high, merging is enabled in the BIU 80 so that the BIU performs the merger of bit D7 and bits D0–D6.

As noted, the CPU local bus 65 preferably comprises an 80486 style local bus, which as is well known to those skilled in the art, includes separate address and data lines, while the PCI bus 100 preferably includes a plurality of multiplexed address/data lines. Thus, as one skilled in the art will understand, the BIU 80 preferably functions to connect the 32-bit address lines A[31:0] of the local bus 65 to the multiplexed address/data lines AD[31:0] on the PCI bus 100, through an appropriate latching unit (not shown). Similarly, the BIU 80 directly connects the 32-bit data lines D[31:0] of the local bus 65 to the multiplexed address/data lines AD[31:0] of the PCI bus 100. The BIU initiates the transfer of address/data on the PCI bus by issuing a FRAME# in accordance with conventional techniques.

Similarly as shown in FIG. 3, the BIU 80 preferably functions to control the operation of the ISA bridge 155 by generating appropriate control signals to the ISA bridge. Details regarding the ISA control unit of the BIU 80 and the ISA bridge 155 are disclosed in commonly assigned U.S. patent application Ser. No. 08/190,647, the teachings of which are incorporated herein. As disclosed in U.S. patent application Ser. No. 08/190,647, the ISA bridge 155 preferably includes an address latch 205 and a dedicated data buffer 210 for the IDE controller 125. The BIU 80 controls the operation of the ISA bridge 155 by generating appropriate control signals, including a loading signal LDEN, an IDE buffer enable signal HDBEN, a buffer direction signal SUBDIR, and chip select signals CSG(3:0).

The LDEN signal enables the address latch 205 thereby permitting the latch 205 to capture address signals off of the AD lines of the PCI bus 100. The HDBEN signal enables the dedicated IDE data buffer 210, while the SUBDIR signal indicates the direction in which data is to be transferred through buffer 210. The chip select signals CSG(3:0) select the particular ISA peripheral device (such as IDE controller 125 in FIG. 3). The ISA bridge 155 preferably includes a decoder (not shown) to decode the chip select signals to determine which ISA peripheral device to select.

Figure 5C:
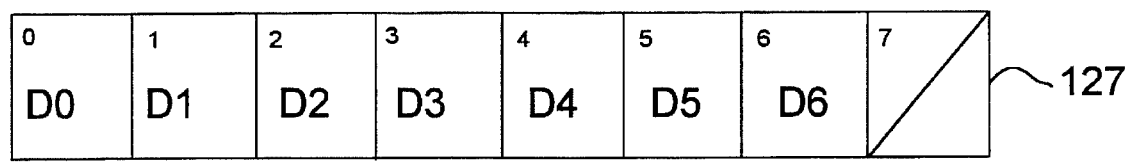

In accordance with the principles of the present invention, the IDE controller 125 may be located on either the ISA bus 150 (FIG. 3) or the PCI bus 100 (FIG. 4). The IDE controller 125 functions to control the operation of an IDE hard drive 130 in accordance with conventional techniques. Regardless of where the IDE controller 125 is located, it preferably includes a configuration register 127 with an address value of 3F7h. As shown in FIG. 5C, bits D0 though D6 of register 127 provide information indicative of IDE status operation. In the alternative embodiment, as shown for example in FIG. 4, the IDE controller 125 may connect directly via line 128 to the DSK CHG output of the floppy drive 77 to receive the DSK CHG# signal. In this embodiment, the DSK CHG# signal is applied to bit D7 of the configuration register 127 so that the IDE controller 125 performs the merger.

Referring to FIGS. 3 and 4, and in accordance with conventional techniques, the floppy drive 77 provides a DSK CHG# output signal to the floppy controller 75 indicative of whether a floppy disk has been removed from the drive. The DSK CHG# signal preferably is an active low input signal which remains active until a STEP# pulse is received from the floppy drive controller 75 with a disk present in the floppy drive 77. In the preferred embodiment of FIG. 3, the DSK CHG# output signal also is applied via a direct connection to the BIU 80 on line 82. In the alternative embodiment of FIG. 4, wherein the IDE connects to the PCI bus, the DSK CHG# output signal may either connect to the IP through line 182 or to the IDE controller 125 through line 128.

Figure 5D:
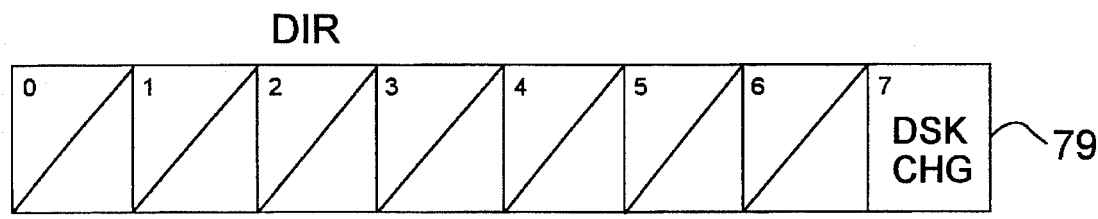

In accordance with the preferred embodiment, the floppy controller 75 comprises part of a companion chip 175 that connects to the IP 50 through the PCI bus and a number of PCI sideband signals. In addition to the floppy drive controller 75, the companion chip 175 preferably includes other peripheral units 180, such as a power management unit or data port units. The floppy controller 75 includes a configuration register 79 (called the DIR register in the preferred embodiment) with a bit (D7) indicative of the status of any disk change DSK CHG# signal received from the floppy disk drive 77 (see FIG. 5D). This configuration register 79 has an address value of 3F7h to remain compatible with previous BIOS systems. The floppy drive controller 75 (or alternatively the companion chip) also includes a second configuration register 73 (C2) with a dedicated bit to indicate to the floppy controller 75 whether it is to respond to an address to the DIR register 79.

The floppy drive controller 75 preferably receives the DSKCHG# signal from the floppy drive to indicate when a disk change has occurred. In accordance with conventional techniques, the floppy drive controller 75 preferably provides a STEP# pulse to the floppy drive 77 to move the head of the floppy drive to the next cylinder. The STEP# pulse also functions to reset the DSK CHG# signal in the preferred embodiment.

As noted above, the DSK CHG# signal from the floppy drive also is preferably provided directly to the IP 50 via a fixed connection 82, enabling pin FDCD7 to be removed from the companion chip 175. In the alternative embodiment of FIG. 4, the DSK CHG# signal may be provided directly either to the IP 50 via line 182, or to the IDE controller 125 via direct connection 128. The decision of whether to provide the DSK CHG# signal to the IDE controller 125 or to the IP 50 depends primarily upon whether the DSK CHG# signal is at a voltage level that is compatible with the IP 50. If so, then it is preferred to provide the connection 182 to the IP 50 and not the connection 128 to the IDE controller 125.

Referring now to FIGS. 3, 4 and 5A–5D, the operation of the present invention now will be described. In the preferred embodiment, the Address Control Register 155 and the ISACFG register 165 in the BIU 80 and the C2 register 73 in the floppy controller 75 are configured during system initialization by the system BIOS. Alternatively, these registers may be loaded subsequently by an external operator command.

Thus, the IDEDR bit (bit 4) of the Address Control register 155 is configured to indicate the location of the IDE controller 125. If the IDE controller 125 resides on the ISA bus 150, the IDEDR bit is set to "0." Conversely, if the IDE controller 125 resides on the PCI bus, the IDEDR bit is set to "1."

Similarly, the MERGE bit of the ISACFG register 165 is configured to indicate whether the BIU 80 or the IDE controller 125 is to perform the merge. If the MERGE bit is set to "1," the BIU 80 performs the merge. If the MERGE bit is set to "0," the IDE controller 125 performs the merge.

The configuration register 73 in the floppy drive controller 75 (or alternatively the companion chip) is configured to indicate whether the floppy controller 75 is authorized to respond to an access to address 3F7h. If the dedicated bit is set to "0," then the floppy drive controller 75 is not authorized to respond. Conversely, if the bit is set to "1," the floppy controller 75 is authorized to respond to an access to the DIR register 79.

During operation, the BIU 80 checks the status of the IDEDR bit of the ACR register 155 to determine the location of the IDE controller 125 and also preferably checks the FLCR bit of the ACR register 155 to determine the location of the floppy controller 75. The following discussion assumes that the floppy controller 75 resides on the PCI bus 100.

The BIU 80 then accesses the appropriate bus as determined by the IDEDR bit of the ACR 155. Thus, if the IDEDR bit is a "0" indicating the IDE controller 125 resides on the ISA bus 150, as shown in FIG. 3, and the MERGE bit of the ISACFG register 165 is set to "1" to indicate that the BIU 80 performs the merge (which is the preferred embodiment if the IDE controller 125 is on the ISA bus 150), the BIU 80 performs a read cycle to the ISA bus 150 by asserting the LDEN, HDBEN, SUBDIR and the appropriate CSG(3:0) signals, without asserting the FRAME# signal (which marks the beginning of a PCI cycle). To further minimize the possibility of bus contention, the dedicated bit in the configuration register 73 of the floppy controller 75 is set to "0" to prevent a response. The address value of 3F7h then is driven on the ISA bus 150 to retrieve data bits D0–D6 from the IDE controller 125. The BIU 80 receives data bits D0–D6 and merges this data with D7, which is obtained from the dedicated line 82 from the floppy drive 77.

If the IDE controller 125 resides on the PCI bus 100 (as shown in FIG. 4), then the IDEDR bit of the ACR 155 is set to "1" and either the IDE controller 125 or the BIU 80 may perform the merger. If the voltage of the DSK CHG# signal is compatible with the IP 50, then this signal is applied directly to the BIU 80 on line 182. In this case, the BIU 80 performs the merger and the MERGE bit is set to "1" in ISACFG register 165. The BIU 80 then performs a read cycle to the PCI bus 100 by asserting the FRAME# and driving the address value 3F7h. The dedicated register in the C2 register 73 of the floppy drive controller 75 is set to "0" to prevent the floppy drive controller 75 from responding. After receiving bits D0–D6 from the IDE controller 125, the BIU 80 merges this data with the data taken from the DSK CHG# signal.

If the voltage of the DSK CHG# signal is not compatible with the IP 50, then the DSK CHG# signal is applied directly to the IDE controller 125 on line 128. In this instance, the IDE controller 125 performs the merger, as indicated by a "0" in the MERGE bit of the ISACFG register 165. The BIU 80 then performs a PCI bus read cycle to the IDE controller 125 to receive data bits D0–D7.

If the IDE controller 125 is not present in the system, then the BIU 80 may obtain the D7 data bit from the direct connection to the floppy drive 77, if one is provided and the voltage of the DSK CHG# line 182 is compatible with the IP 50. If no direct connection is provided between the floppy drive 77 and the IP 50, then the BIU 80 may obtain the D7 bit from the DIR register 79 of the floppy controller 75 (which must be authorized to respond by setting the dedicated bit in configuration register 73 to a "1") by performing a read cycle on the PCI bus 100 to the address value of 3F7h.

Numerous variations and modifications will become apparent to those skilled in the art once the above disclosure is fully appreciated. It is intended that the following claims be interpreted to embrace all such variations and modifications.

What is claimed is:

1. A system for merging data from a first register in a first component together with data from a second register in a second component, wherein the first register and the second register have the same address value, comprising:

a bus interface unit connected to said first component and to said second component by a bus line;

a CPU connected to said bus interface unit by a local bus;

an address control register associated with said bus interface unit, said address control register including a dedicated bit to indicate the location of said second component;

a configuration register also associated with said bus interface unit, said configuration register including a dedicated bit to indicate whether the bus interface unit is to perform the data merger between said first register and said second register; and a second configuration register in said first component, said second configuration register including a bit indicating whether said first component is authorized to respond to an access to said address value.

2. A system as in claim 1, wherein the first component comprises a floppy drive controller.

3. A system as in claim 2, wherein said second component comprises an IDE drive controller.

4. A system as in claim 2, further comprising a floppy drive connected to said floppy drive controller.

5. A system as in claim 4, wherein the first register includes a data bit indicative of a removal of a floppy disk from said floppy drive.

6. A system as in claim 5, wherein the floppy drive provides a signal indicative of the removal of the floppy disk to said floppy drive controller.

7. A system as in claim 6, wherein the bus interface unit also receives said signal indicative of the removal of the floppy disk.

8. A system as in claim 7, wherein said bus interface unit receives said signal from a direct connection between said floppy drive and said bus interface unit.

9. A system as in claim 8, wherein said bus interface unit receives data bits from said IDE controller by performing a read cycle to said IDE controller.

10. A system as in claim 9, wherein said bus interface unit merges the data bit from said read cycle to said IDE controller with said signal from said floppy drive.

11. A system as in claim 9, wherein said bus interface unit determines the location of said IDE controller from said address control register.

12. A system as in claim 11, wherein said bus interface unit generates a particular read cycle based upon the location of said IDE controller.

13. A system for merging data indicative of a floppy disk removal together with data from an IDE controller, comprising;

a floppy drive for receiving said floppy disk, said floppy drive generating a disk removal output signal;

a floppy controller receiving said disk removal output signal and storing said signal in a first register with a particular address value;

said IDE controller including a second register with the same address value;

an integrated processor connected to said floppy controller and to said IDE controller, said integrated processor also receiving said disk removal signal from said floppy drive through a direct connection to said floppy drive;

said integrated processor including a control register, said control register including a dedicated bit to indicate the location of said IDE controller in said system;

said integrated processor also including a configuration register, said configuration register including a merger bit enabling said integrated processor to perform a merger of data from said first register together with data from said second register.

14. A system as in claim 13, wherein said first and said second registers comprise configuration registers.

15. A system as in claim 13, wherein said floppy controller includes a second configuration register which prevents said floppy controller from responding to read requests to said address value.

16. A system as in claim 15, wherein said floppy controller connects to said integrated processor through a PCI bus.

17. A system as in claim 16, wherein said IDE controller also connects to said integrated processor through said PCI bus.

18. A system as in claim 17, wherein said integrated processor performs a read cycle on said PCI bus to obtain the data from said second register.

19. A system as in claim 18, wherein said integrated processor merges the data from said second register with the disk removal signal from said floppy drive.

20. A system as in claim 16, wherein said IDE controller connects to said integrated processor through an ISA bus.

21. A system as in claim 20, wherein said integrated processor performs a read cycle on said ISA bus to obtain the data from said second register.

22. A system as in claim 21, wherein said integrated processor merges the data from said second register with the disk removal signal from said floppy drive.

23. A system as in claim 20, wherein said ISA bus connects to said PCI bus through an ISA bridge.

24. A system as in claim 23, wherein said ISA bridge includes a data buffer and an address latch.

25. A system as in claim 24, wherein said integrated circuit provides control signals to said data buffer.

26. A system as in claim 25, wherein said integrated processor provides a control signal to said address latch.

27. A system as in claim 13, wherein said integrated circuit includes a bus interface unit.

28. A system as in claim 27, wherein said integrated circuit also includes a CPU core connected to said bus interface unit by a local bus.

* * * * *